(12) United States Patent
Vakrat et al.

(10) Patent No.: US 10,678,325 B2
(45) Date of Patent: Jun. 9, 2020

(54) APPARATUS, SYSTEM, AND METHOD FOR ACCELERATING POSITIONAL TRACKING OF HEAD-MOUNTED DISPLAYS

(71) Applicant: Facebook Technologies, LLC, Menlo Park, CA (US)

(72) Inventors: David Vakrat, Sunnyvale, CA (US); Vlad Fruchter, Los Altos, CA (US); Ohad Meitav, Sunnyvale, CA (US)

(73) Assignee: Facebook Technologies, LLC, Menlo Park, CA (US)

( * ) Notice: Subject to any disclaimer, the term of this patent is extended or adjusted under 35 U.S.C. 154(b) by 26 days.

(21) Appl. No.: 15/985,733

(22) Filed: May 22, 2018

(65) Prior Publication Data
US 2019/0361518 A1    Nov. 28, 2019

(51) Int. Cl.
G06F 3/01     (2006.01)
G06T 19/00    (2011.01)
G06T 7/70     (2017.01)

(52) U.S. Cl.
CPC ............... G06F 3/012 (2013.01); G06T 7/70 (2017.01); G06T 19/006 (2013.01)

(58) Field of Classification Search
CPC ..... G06F 3/012; G06T 19/006; G06T 3/0093; G06T 2207/30224; G06T 2215/16;
(Continued)

(56) References Cited

U.S. PATENT DOCUMENTS 6,445,815 B1    9/2002   Sato
7,312,766 B1   12/2007   Edwards
(Continued)

FOREIGN PATENT DOCUMENTS

FR          2 840 753 A1    12/2003
KR    10-2008-0010502 A      1/2008
(Continued)

OTHER PUBLICATIONS

Partial European Search Report received for EP Patent Application Serial No. 18207788.3 dated Jun. 13, 2019, 16 pages.
(Continued)

*Primary Examiner* — Liliana Cerullo
(74) *Attorney, Agent, or Firm* — FisherBroyles, LLP

(57) ABSTRACT

The disclosed special-purpose hardware device may include an image signal processor that receives, from a camera device of a head-mounted-display system, image frames of a physical environment. The special-purpose hardware device may also include a positional tracking component that (1) stores at least a portion of the image frames in a cache of the special-purpose hardware device that has a faster access speed than a main memory of the special-purpose hardware device, (2) tracks, based on the portion of the image frames stored in the cache, a change in the position of the head-mounted display system within the physical environment, and (3) stores the change in the position of the head-mounted-display system in the main memory for use in generating one or more augmented-reality frames. The special-purpose hardware device may further include a frame-output interface that feeds the augmented-reality frames to a display device of the head-mounted-display system.

19 Claims, 10 Drawing Sheets

(58) Field of Classification Search
CPC .. G06T 7/292; G02B 27/017; G02B 27/0179; G02B 27/0093; G02B 2027/014; G02B 2027/0138; G02B 2027/0147; G09T 1/20; H04N 13/366; H04N 13/383
See application file for complete search history.

(56) References Cited

U.S. PATENT DOCUMENTS

| | | | |
|---|---|---|---|
| 7,804,507 | B2 | 9/2010 | Yang et al. |
| 8,327,071 | B1 | 12/2012 | Danskin et al. |
| 8,417,031 | B2 | 4/2013 | Kasahara |
| 9,633,479 | B2 | 4/2017 | Grasso et al. |
| 9,858,637 | B1 | 1/2018 | Quach et al. |
| 9,984,499 | B1 * | 5/2018 | Jurgenson .............. G06T 17/00 |
| 10,152,775 | B1 | 12/2018 | Bellows et al. |
| 2007/0188522 | A1 | 8/2007 | Tsuyuki |
| 2008/0024597 | A1 | 1/2008 | Yang et al. |
| 2008/0297437 | A1 | 12/2008 | Takahashi |
| 2009/0226086 | A1 | 9/2009 | Kasahara |
| 2010/0207957 | A1 | 8/2010 | Taneja et al. |
| 2013/0201291 | A1 | 8/2013 | Liu et al. |
| 2015/0029218 | A1 | 1/2015 | Williams et al. |
| 2015/0206353 | A1 | 7/2015 | Grasso et al. |
| 2016/0035139 | A1 | 2/2016 | Fuchs et al. |
| 2016/0037085 | A1 | 2/2016 | Mills et al. |
| 2016/0203642 | A1 | 7/2016 | Thomas |
| 2016/0238852 | A1 | 8/2016 | Ellsworth et al. |
| 2016/0314564 | A1 | 10/2016 | Jones et al. |
| 2016/0328882 | A1 | 11/2016 | Lee et al. |
| 2016/0364904 | A1 | 12/2016 | Parker et al. |
| 2017/0200308 | A1 | 7/2017 | Nguyen et al. |
| 2017/0243324 | A1 | 8/2017 | Mierle et al. |
| 2017/0336863 | A1 | 11/2017 | Tilton et al. |
| 2017/0345220 | A1 | 11/2017 | Bates |
| 2018/0012416 | A1 | 1/2018 | Jones et al. |
| 2018/0081429 | A1 | 3/2018 | Akenine-Moller et al. |
| 2018/0082482 | A1 | 3/2018 | Motta et al. |
| 2018/0136465 | A1 | 5/2018 | Chi et al. |
| 2018/0143442 | A1 | 5/2018 | Gupta |
| 2018/0146189 | A1 | 5/2018 | Park |
| 2018/0211638 | A1 | 7/2018 | Ozguner et al. |
| 2018/0249151 | A1 | 8/2018 | Freeman et al. |
| 2018/0286105 | A1 | 10/2018 | Surti et al. |

FOREIGN PATENT DOCUMENTS

| | | |
|---|---|---|
| KR | 10-2016-0139461 A | 12/2016 |
| WO | 2016/190489 A1 | 12/2016 |
| WO | 2017/139871 A1 | 8/2017 |

OTHER PUBLICATIONS

Wikipedia, "CPU cache", URL: https://en.wikipedia.org/wiki/CPU_cache, Apr. 22, 2018, 23 pages.

Extended European Search Report received for EP Patent Application Serial No. 18188235.8 dated Mar. 19, 2019, 18 pages.

Waveren, J.M.P. van, "The Asynchronous Time Warp for Virtual Reality on Consumer Hardware", Proceedings of the 22nd ACM Conference on Virtual Reality Software and Technology, 2016, pp. 37-46.

Partial European Search Report received for EP Patent Application Serial No. 18187455.3 dated Mar. 26, 2019, 20 pages.

International Search Report and Written Opinion received for PCT Application Serial No. PCT/US2018/036975 dated Feb. 20, 2019, 12 pages.

International Search Report and Written Opinion received for PCT Application Serial No. PCT/US2018/038224 dated Dec. 21, 2018, 18 pages.

International Search Report and Written Opinion received for PCT Application Serial No. PCT/US2018/038230 dated Nov. 1, 2018, 16 pages.

Virginia Polytechnic Institute and State University, "Clock Domain Crossing", URL: https://filebox.ece.vt.edu/~athanas/4514/ledadoc/html/pol_cdc.html, May 11, 2015, 24 pages.

Vlad Fruchter, et al.; Apparatus, System, and Method for Mitigating Motion-To-Photon Latency in Head-Mounted Displays; U.S. Appl. No. 62/626,004, filed Feb. 3, 2018.

U.S. Appl. No. 62/489,801, filed Apr. 25, 2017, 69 pages.

Extended European Search Report received for EP Patent Application Serial No. 18207788.3 dated Nov. 12, 2019, 15 pages.

Jiang et al., "Camera Tracking for Augmented Reality Media", IEEE International Conference on Multimedia and Expo, Proceedings, Latest Advances in the Fast Changing World of Multimedia (Cat. No. 00TH8532), vol. 3, Jul. 30, 2000, pp. 1637-1640.

Extended European Search Report received for EP Patent Application Serial No. 18187455.3 dated Nov. 29, 2019, 29 pages.

Orlosky et al., "VisMerge: Light Adaptive Vision Augmentation via Spectral and Temporal Fusion of Non-visible Light", 2017 IEEE International Symposium on Mixed and Augmented Reality, Oct. 9, 2017, pp. 22-31.

\* cited by examiner

APPARATUS, SYSTEM, AND METHOD FOR ACCELERATING POSITIONAL TRACKING OF HEAD-MOUNTED DISPLAYS

BACKGROUND

Over the last several years, head-mounted displays have revolutionized the way people experience various kinds of digital media. For example, head-mounted displays may allow virtual-reality users to experience realistic, immersive virtual environments while playing video games, during flight simulation training, or even when interacting with co-workers around the globe. In addition to such virtual-reality applications, head-mounted displays may also enable users to augment reality and/or combine certain aspects of reality with those of the virtual world.

Despite incredible advances in such technology, traditional head-mounted displays may still have certain deficiencies that negatively impact the overall user experience. For example, some traditional head-mounted displays may exhibit noticeable visual delays following certain changes in position and/or orientation. More specifically, because these head-mounted displays often account for positional changes when incorporating virtual content into images and/or videos, any delays in obtaining the information used to determine such position changes may ultimately slow the entire image processing cycle.

Further complicating the issue, some traditional head-mounted displays may necessitate large amounts of power and/or computing resources to accurately determine changes in position and/or orientation. In an effort to reduce both delays and power consumption, these traditional head-mounted displays may sacrifice the accuracy of positional tracking systems by determining certain positional changes based on low-resolution image data.

The instant disclosure, therefore, identifies and addresses a need for additional apparatuses, systems, and methods for accelerating positional tracking of head-mounted displays.

SUMMARY

As will be described in greater detail below, the instant disclosure generally relates to apparatuses, systems, and methods for accelerating positional tracking in head-mounted displays. In some embodiments, a special-purpose hardware device may achieve this goal and/or may provide various other features. For example, a special-purpose hardware device may include an image signal processor that receives, from a camera device of a head-mounted-display system, image frames of a physical environment surrounding the head-mounted-display system. The special-purpose hardware device may also include a positional tracking component that stores at least a portion of the image frames in a cache of the special-purpose hardware device. This cache may have a faster access speed than a main memory of the special-purpose hardware device. The positional tracking component may also track, based at least in part on the portion of the image frames stored in the cache of the special-purpose hardware device, a change in the position of the head-mounted display system within the physical environment. The positional tracking component may then store the change in the position of the head-mounted-display system in the main memory for use in generating one or more augmented-reality frames to be presented to a user wearing the head-mounted-display system. In addition, the special-purpose hardware device may include a frame-output interface that feeds the augmented-reality frame to a display device of the head-mounted-display system.

In some examples, the positional tracking component may identify one or more features of the physical environment that represent at least portions of physical objects located within the physical environment. The positional tracking component may also maintain, within the main memory of the special-purpose hardware device, an image map that identifies one or more physical locations of the features within the physical environment.

In some embodiments, the positional tracking component may include a hardware-accelerated feature-detection component. This feature-detection component may detect at least one of the features of the physical environment within an incoming image frame as the incoming image frame is received and stored in the cache of the special-purpose hardware device. The feature-detection component may then pass the detected features to the main memory of the special-purpose hardware device to facilitate incorporating the detected features into the image map.

The positional tracking component may also include a hardware-accelerated image processing component. This image processing component may create at least one low-resolution version of an incoming image frame as the incoming image frame is received and stored in the cache of the special-purpose hardware device. The image processing component may then pass the low-resolution versions of the incoming image frame to the main memory of the special-purpose hardware device to facilitate tracking the change in the position of the head-mounted-display system.

In some examples, the positional tracking component may identify a set of key features within the physical environment that facilitate tracking changes in the position of the head-mounted-display system. In these examples, the positional tracking component may (1) identify an initial location of a representation of at least one key feature of the physical environment within an initial image frame captured by the camera device, (2) identify a subsequent location of a representation of the key feature of the physical environment within a subsequent image frame captured by the camera device, and then (3) compare the initial location of the representation of the key feature with the subsequent location of the representation of the key feature.

In one embodiment, the positional tracking component may identify the subsequent location of the representation of the key feature within the subsequent image frame by (1) determining, based on the initial location of the representation of the key feature within the initial image frame, an expected region of the subsequent image frame in which the key feature of the physical environment is likely to be represented and then (2) identifying a specific location of the representation of the key feature within the subsequent image frame by searching the expected region of the subsequent image frame.

In some examples, the positional tracking component may generate one or more image patches that represent physical appearances of the key feature within the physical environment from distinct perspectives. In one embodiment, the positional tracking component may store these images patches within the main memory of the special-purpose hardware device.

In some embodiments, the positional tracking component may include an image searching unit. The image searching unit may identify the specific location of the representation of the key feature within the subsequent image frame by (1) warping at least one image patch such that the image patch resembles a current physical appearance of the key feature from a perspective at which the camera device captured the subsequent image frame and then (2) identifying a location within the subsequent image frame at which pixel values of the warped image patch most closely match corresponding pixel values of the subsequent image frame. In one example, the image searching unit may identify a sub-pixel location of the representation of the key feature within the subsequent image frame by (1) performing a sub-pixel interpolation analysis of pixel values within the expected region of the subsequent image frame and then (2) determining, based on the sub-pixel interpolation analysis, a sub-pixel location at which the pixel values of the warped image patch most closely match the corresponding pixel values of the subsequent image frame.

In some examples, the image searching unit may determine that an additional key feature of the physical environment is expected to be represented within the expected region of the subsequent image frame. In these examples, the image searching unit may load the expected region of the subsequent image frame into the cache of the special-purpose hardware device. The image searching unit may then identify both the specific location of the representation of the key feature and a specific location of a representation of the additional key feature within the subsequent image frame by searching the expected region of the subsequent image frame within the cache of the special-purpose hardware device.

In some embodiments, the special-purpose hardware device may include a hardware-accelerated searching component. This searching component may be dedicated to both identifying the specific location of the representation of the key feature within the subsequent image frame and identifying a physical location of the key feature within the physical environment. In one example, the searching component may identify the physical location of the key feature within the physical environment by (1) identifying specific locations of representations of the key feature within previous image frames captured by the camera device and then (2) performing an epipolar search for a three-dimensional location of the key feature within the physical environment based on the specific locations of the representations of the key feature within the previous image frames.

In some examples, the special-purpose hardware device may include a frame-generation unit. This frame-generation unit may retrieve the position of the head-mounted-display system within the main memory of the special-purpose hardware device. While generating the augmented-reality frame to be presented to the user, the frame-generation unit may adjust at least one aspect of the augmented-reality frame to account for the change in the position of the head-mounted-display system.

A corresponding head-mounted-display system may include at least one camera device that captures image frames of a physical environment surrounding the head-mounted-display system. The head-mounted-display system may also include a special-purpose hardware device communicatively coupled to the camera device. The special-purpose hardware device may store at least a portion of the image frames in a cache within the special-purpose hardware device as the image frames are received from the camera device. In one embodiment, this cache may have a faster access speed than a main memory of the special-purpose hardware device. The special-purpose hardware device may also track, based at least in part on the portion of the image frames stored in the cache, a change in a position of the head-mounted-display system within the physical environment. The special-purpose hardware device may further store the change in the position of the head-mounted-display system in the main memory for use in generating at least one augmented-reality frame to be presented to a user wearing the head-mounted-display system. In addition, the head-mounted-display system may include a display device communicatively coupled to the special-purpose hardware device. This display device may receive the augmented-reality frames from the special-purpose hardware device and then present the augmented-reality frames to the user wearing the head-mounted-display system.

In some examples, the head-mounted-display system may include a communication interface communicatively coupled to an independent host device that feeds virtual image content to the head-mounted-display system. The head-mounted-display system may also include at least one additional camera device that captures one or more image frames from a perspective of the user wearing the head-mounted-display system. In some embodiments, the special-purpose hardware device may generate the augmented-reality frame to be presented to the user by overlaying the virtual image content received from the independent host device onto the image frame from the perspective of the user wearing the head-mounted-display system. In one example, the head-mounted-display system may also include a hardware-accelerated image-correction component that applies asynchronous time warping or asynchronous space warping to the virtual image content based at least in part on the change in the position of the head-mounted-display system.

In some embodiments, the head-mounted-display system may include an inertial measurement unit communicatively coupled to the special-purpose hardware device. In such embodiments, the special-purpose hardware device may track the change in the position of the head-mounted-display system based further on data provided by the inertial measurement unit.

A corresponding method may include (1) receiving, by a special-purpose hardware device from a camera device of a head-mounted-display system, image frames of a physical environment surrounding the head-mounted-display system, (2) storing, by the special-purpose hardware device, at least a portion of the image frames in a cache of the special-purpose hardware device as the image frames are received from the camera device, the cache having a faster access speed than a main memory of the special-purpose hardware device, (3) tracking, by the special-purpose hardware device based at least in part on the portion of the image frames stored in the cache, a change in a position of the head-mounted-display system within the physical environment, (4) storing, by the special-purpose hardware device, the change in the position of the head-mounted-display system in the main memory for use in generating at least one augmented-reality frame to be presented to a user wearing the head-mounted-display system, and then (5) feeding, by the special-purpose hardware device, the augmented-reality frame to a display device of the head-mounted-display system such that the display device presents the augmented-reality frame to a user wearing the head-mounted-display system.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification.

Together with the following description, these drawings demonstrate and explain various principles of the instant disclosure.

Figure 1:
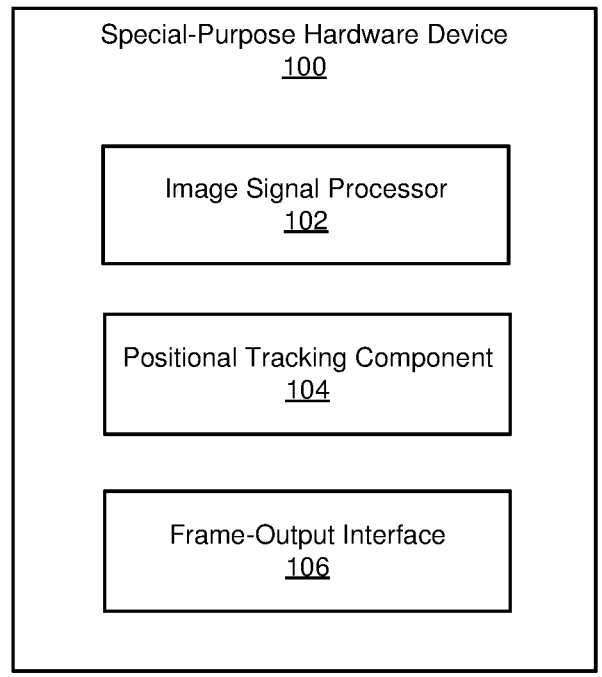
FIG. 1 is a block diagram of an exemplary special-purpose hardware device for accelerating positional tracking of head-mounted displays in accordance with some embodiments.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to apparatuses, systems, and methods for accelerating positional tracking of head-mounted displays. As will be explained in greater detail below, the apparatuses, systems, and methods disclosed herein may reduce the number of Dynamic Random Access Memory (DRAM) accesses involved in tracking changes in the position of a head-mounted display. Specifically, these apparatuses, systems, and methods may cache incoming image data rather than buffering the data in DRAM. By performing at least part of a positional tracking algorithm based on this cached data, the disclosed apparatuses, systems, and methods may reduce or minimize the number of required DRAM accesses. Because DRAM accesses may generally be more resource-intensive than performing in-line operations in cache, these apparatuses, systems, and methods may reduce both processing time and power consumption of the head-mounted displays.

Embodiments of the instant disclosure may further improve the efficiency of performing a positional tracking algorithm by caching and analyzing only relevant portions of incoming image frames. More specifically, the disclosed apparatuses, systems, and methods may divide incoming image frames into tiles and then cache tiles that contain data relevant for performing computer vision operations, such as feature tracking. By increasing the efficiency of a positional tracking algorithm, these apparatuses, systems, and methods may enable a head-mounted display to process high-resolution image data, thereby generating more precise and accurate positional tracking data than traditional positional tracking systems.

Additionally or alternatively, these apparatuses, systems, and methods may implement a hardware-accelerated computer vision unit that efficiently tracks the position of a head-mounted display via one or more integrated circuits or hardware blocks. In particular, this hardware-accelerated unit may reuse certain hardware blocks for different processing steps (e.g., a single hardware block may be configured to perform two or more steps of a positional tracking algorithm). By doing so, the disclosed apparatuses, systems, and methods may reduce both power consumed while performing a positional tracking algorithm and the on-chip presence of the computer vision unit.

Reference will now be made to various exemplary embodiments, examples of which are illustrated in the accompanying drawings. In the following description, numerous specific details are set forth in order to provide an understanding of the various described embodiments. However, it will be apparent to one of ordinary skill in the art that the various described embodiments may be practiced without these specific details. In other instances, well-known systems, methods, procedures, components, circuits, and networks have not been described in detail so as not to unnecessarily obscure aspects of the embodiments.

The following will provide, with reference to FIGS. 1-9, detailed descriptions of exemplary apparatuses, systems, and/or corresponding implementations for accelerating positional tracking of head-mounted displays. Detailed descriptions of methods for accelerating positional tracking of head-mounted displays will be provided in connection with FIG. 10.

FIG. 1 illustrates an exemplary special-purpose hardware device 100 for accelerating positional tracking in accordance with some embodiments. In certain examples, special-purpose hardware device 100 may be incorporated in and/or represent part of a head-mounted display. In such examples, special-purpose hardware device 100 may be responsible for tracking changes in the position, orientation, and/or inertia of the head-mounted display.

Special-purpose hardware device 100 generally represents a circuit, system, and/or hardware accelerator designed to perform various image processing operations and/or positional tracking algorithms. In some examples, special-purpose hardware device 100 may include and/or represent a System on a Chip (SoC) and/or an Application-Specific Integrated Circuit (ASIC). For example, special-purpose hardware device 100 may implement a Computer Vision (CV) accelerator by way of an SoC and/or an ASIC. In some embodiments, the term "CV accelerator" may refer to any software- and/or hardware-based component or device that performs a positional tracking algorithm.

In addition to a CV accelerator, the SoC and/or ASIC may also include a variety of other computing components involved in processing images for display by the head-mounted display. Examples of such computing components include, without limitation, Advanced Reduced Instruction Set Computer (RISC) Machine (ARM) processors, Central Processing Units (CPUs), Image Signal Processors (ISPs), Digital Signal Processors (DSPs), display imaging pipelines, video encoders, video decoders, hardware-accelerated processing components, combinations or variations of one or more of the same, and/or any other suitable components.

As illustrated in FIG. 1, special-purpose hardware device 100 may include an image signal processor 102, a positional tracking component 104, and a frame-output interface 106. In some examples, image signal processor 102 may receive image frames from cameras onboard the head-mounted display. Image signal process 102 may optionally perform one or more image-processing operations on the image frames (such as re-formatting and/or re-scaling the images) and then pass the image frames to positional tracking component 104. Positional tracking component 104 may detect changes in the position of the head-mounted display based on the received images. For example, positional tracking component 104 may detect various features (e.g., physical objects or portions of physical objects) within a physical environment surrounding the head-mounted display based on the received images. Positional tracking component 104 may then calculate and/or infer changes in the position of the head-mounted display system based on tracking representations of the features within the image frames over time.

In some embodiments, one or more additional components of special-purpose hardware device 100 may use the positional tracking information generated by positional tracking component 104 to create image frames for presentation to a user of the head-mounted display. For example, a frame-generation component (not explicitly illustrated in FIG. 1) within special-purpose hardware device 100 may update and/or correct virtual-reality, mixed-reality, and/or augmented-reality image frames based on the positional changes of the head-mounted display. Frame-output interface 106 may then send, transmit, and/or feed these image frames to a display device integrated and/or incorporated into the head-mounted display. By doing so, frame-output interface 106 may enable the display device to display the generated frames for presentation to the user wearing the head-mounted display. In one example, frame-output interface 106 may include and/or represent a Mobile Industry Processor Interface (MIPI) Display Serial Interface (DSI).

Figure 2:
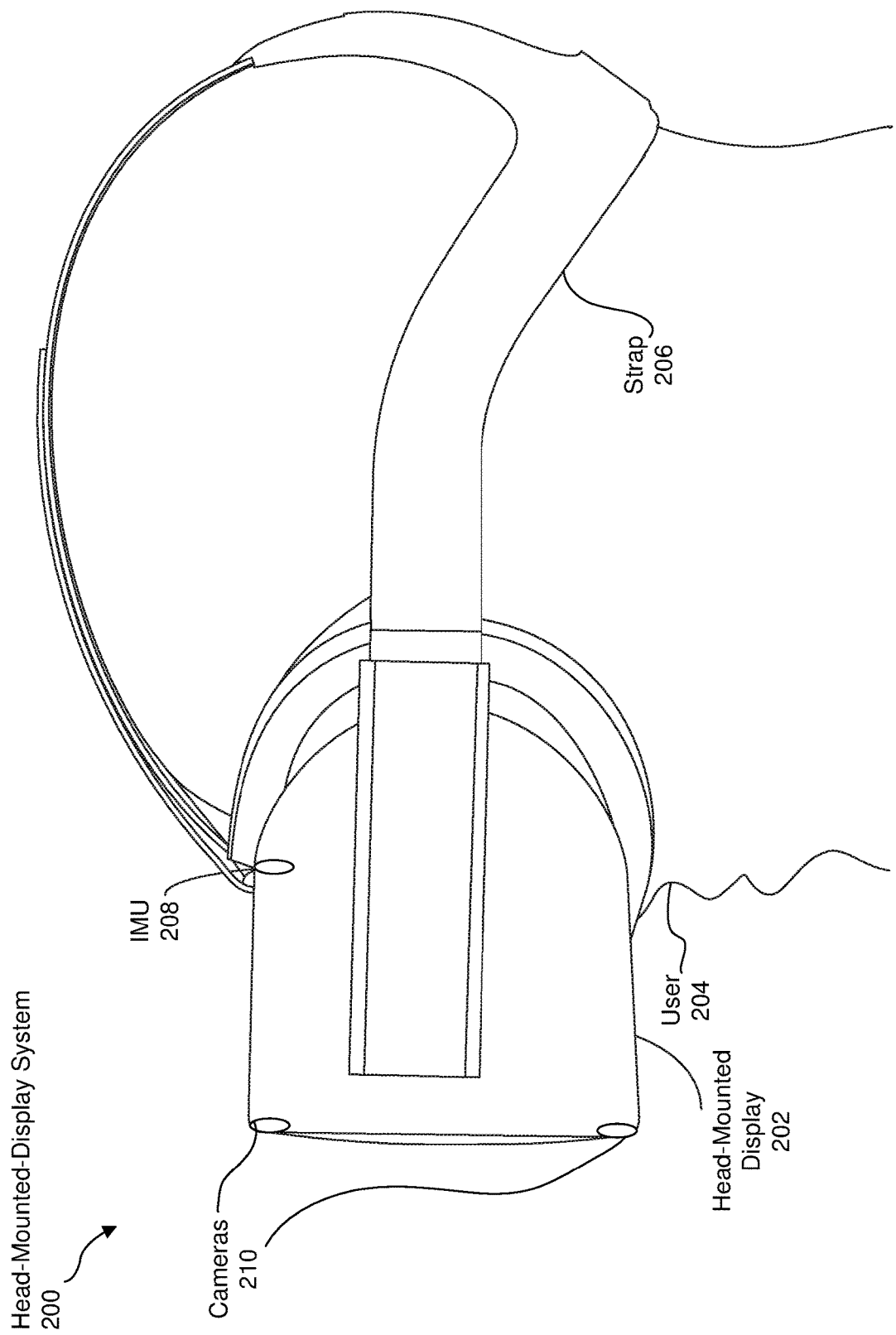
FIG. 2 is an illustration of an exemplary head-mounted display that incorporates a special-purpose hardware device for accelerating positional tracking of head-mounted displays in accordance with some embodiments.

FIG. 2 illustrates an exemplary head-mounted-display system 200 worn by a user 204 in accordance with some embodiments. As illustrated in FIG. 2, head-mounted-display system 200 may include a strap 206 coupled to a head-mounted display 202. In this example, head-mounted display 202 may include one or more cameras 210 that capture images and/or video of the surroundings of user 204. In some embodiments, cameras 210 may be positioned and/or angled to capture a broad visual field (e.g., a 360° visual field) surrounding head-mounted display 202. In this way, cameras 210 may facilitate tracking movement of head-mounted display 202 in any and/or all directions.

In some embodiments, cameras 210 may also capture images and/or video from the perspective of user 204. For example, at least one of cameras 210 may be aligned with the eyeline of user 204. Thus, cameras 210 may facilitate a see-through functionality or feature and/or enable head-mounted display 202 to serve as a mixed-reality portal in which the real-world surroundings of user 204 are blended with virtual-world content. Examples of cameras 210 include, without limitation, digital photographic cameras, RGB cameras, Complementary Metal Oxide Semiconductor (CMOS) image sensors, Charge Coupled Device (CCD) image sensors, imaging sensor arrays, variations or combinations of one or more of the same, combinations of one or more of the same, and/or any other suitable cameras.

As illustrated in FIG. 2, head-mounted-display system 200 may include one or more Inertial Measurement Units (IMUs), such as IMU 208. IMU 208 generally represents any type or form of sensor, instrument, and/or device that measures forces such as the angular rate and specific force of a body. For example, while incorporated into and/or attached to head-mounted display 202, IMU 208 may detect changes in the inertia of head-mounted display 202. IMU 208 may detect these changes using various mechanisms and/or tools, such as accelerometers, gyroscopes, magnetometers, and/or electronic compasses. In some embodiments, the inertial measurement data generated by IMU 208 may indicate and/or be used to determine changes in the position and/or orientation of head-mounted display 202.

The term "head-mounted display" may, in some examples, refer to any type or form of display device or system that is worn on or about a user's face and displays visual content to the user. Head-mounted displays may display content in any suitable way, including via a screen (e.g., an LCD or LED screen), a projector, a cathode ray tube, an optical mixer, etc. Head-mounted displays may display content in one or more media formats. For example, head-mounted display 202 may display video, photos, computer-generated imagery (CGI), and/or combinations of the same.

Head-mounted displays may provide diverse and distinctive user experiences. Some head-mounted displays may provide virtual-reality experiences (i.e., they may display computer-generated or pre-recorded content), while other head-mounted displays may provide real-world experiences (i.e., they may display live imagery from the physical world). Head-mounted displays may also provide any mixture of live and virtual content. For example, virtual content may be projected onto the physical world (e.g., via optical or video see-through) to provide and/or facilitate augmented-reality or mixed-reality experiences. In some embodiments, the terms "augmented-reality" and "mixed-reality" may both refer to any type or form of content and/or experience that combines and/or incorporates virtual content with real-world content. Accordingly, for the purpose of readability in the instant disclosure, the terms "augmented-reality" and "mixed-reality" may be used interchangeably and/or synonymously.

Head-mounted displays may be configured to be mounted to a user's head in a number of ways. Some head-mounted displays may be incorporated into glasses or visors. Other head-mounted displays may be incorporated into helmets, hats, or other headwear.

As illustrated in FIG. 2, user 204 may place head-mounted-display system 200 on the user's head such that head-mounted display 202 is positioned and/or rests on the user's face. By placing head-mounted-display system 200 on his or her face in this way, user 204 may situate head-mounted display 202 over his or her eyes to experience and/or view virtual content presented on head-mounted display 202. User 204 may also secure head-mounted display 202 in the correct position by wrapping strap 206 around the back of the user's head.

Figure 3:
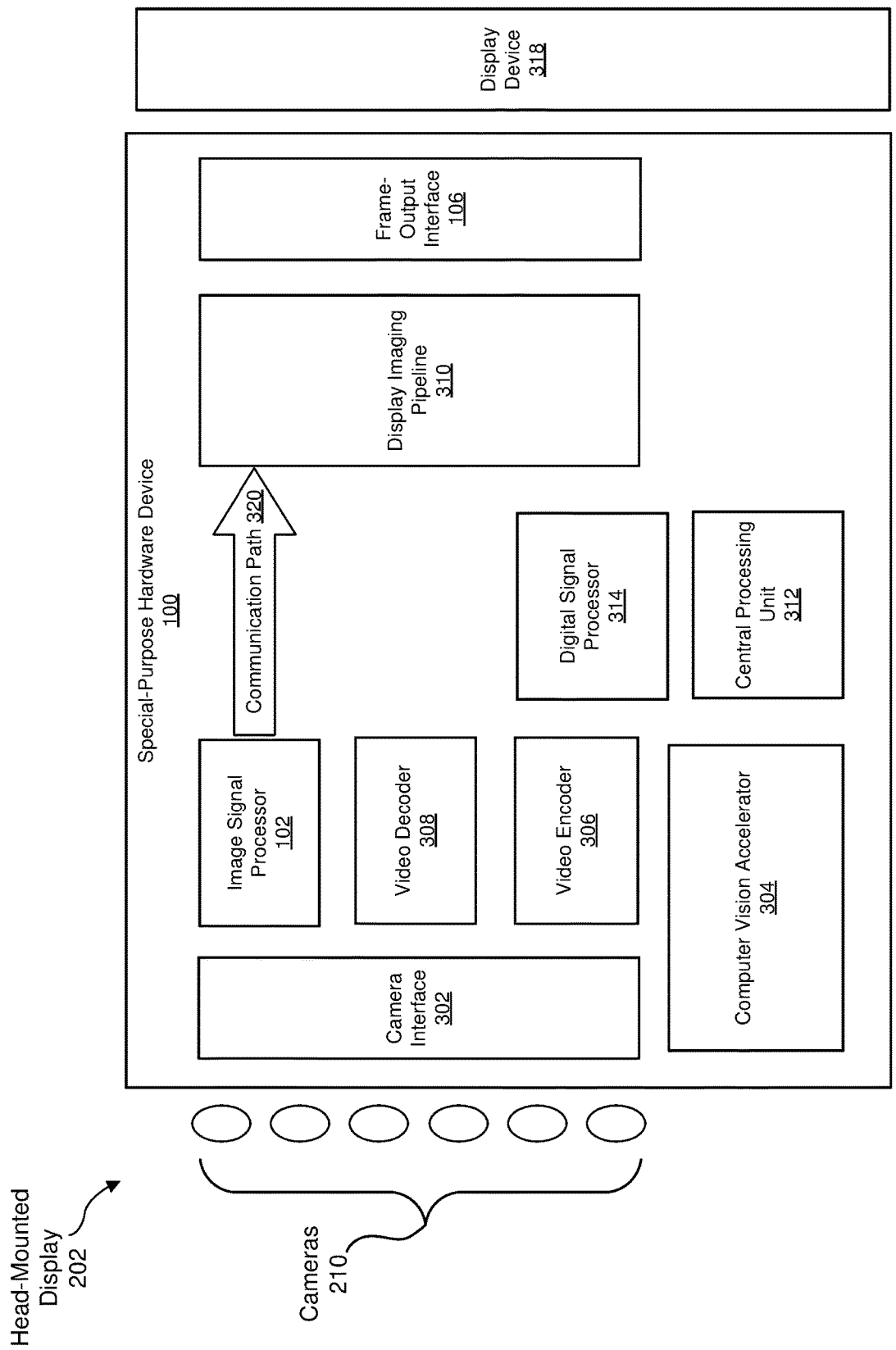
FIG. 3 is a block diagram of an exemplary head-mounted display that incorporates a special-purpose hardware device for accelerating positional tracking of head-mounted displays in accordance with some embodiments.

FIG. 3 illustrates exemplary components incorporated into head-mounted display 202 for accelerating positional tracking in accordance with some embodiments. As illustrated in FIG. 3, head-mounted display 202 may include special-purpose hardware device 100, cameras 210, and a display device 318. In some examples, display device 318 may include a screen that renders image frames (such as virtual-reality, augmented-reality, and/or mixed-reality frames) for presentation to the user wearing head-mounted display 202. Examples of display device 318 include, without limitation, Liquid Crystal Displays (LCDs), Light Emitting Diode (LED) displays, retinal projection displays, variations or combinations of one or more of the same, and/or any other suitable display device.

As illustrated in FIG. 3, special-purpose hardware device 100 may include various components and/or hardware-accelerated devices. For example, special-purpose hardware device 100 may include image signal processor 102, a camera interface 302, a CV accelerator 304, a video encoder 306, a video decoder 308, a central processing unit 312, a digital signal processor 314, a display imaging pipeline 310, a communication path 320, and frame-output interface 106. All or a portion of these components may operate separately or in conjunction with one another while performing tasks such as tracking the position of head-mounted display 202 and/or generating image frames to be presented to a user of head-mounted display 202.

In some embodiments, CV accelerator 304 may include various hardware-accelerated positional-tracking components responsible for performing various image processing operations. For example, CV accelerator 304 may be designed specifically for performing positional tracking of head-mounted display 202. In some embodiments, the phrase "positional tracking" may refer to any technique or algorithm that detects changes in the position, orientation, and/or inertia of a device with respect to a physical environment in which the device is located. For example, positional tracking may be used to detect when a user wearing a head-mounted display has turned his or her head (thus changing the orientation and/or inertia of the head-mounted display). Additionally or alternatively, positional tracking may be used to detect when the user has moved to a new location (by, e.g., taking a step), thereby changing the distance between the user and one or more physical objects near the user.

Positional tracking information may often be used to provide a user of a head-mounted display with a more realistic and/or immersive virtual-reality experience. For example, CV accelerator 304 may pass positional information about head-mounted display 202 to one or more other components of special-purpose hardware device 100 (such as display imaging pipeline 310). While generating augmented-reality frames to be presented to a user, these components may correct and/or update the augmented-reality frames to more accurately reflect and/or correspond to the current position of head-mounted display 202.

Many traditional head-mounted display systems have performed positional tracking with Graphics Processing Units (GPUs), as opposed to SoCs and/or ASICs. However, because GPUs are essentially general-purpose computing components, they are not specifically designed to perform such operations in virtual-reality, augmented-reality, and/or mixed-reality contexts. As a result, GPUs may incorporate and/or implement certain features and/or functionalities that slow down such operations, thereby potentially causing or contributing to lag and/or inaccurate blending of virtual content and real content when the GPUs are deployed in virtual-reality, augmented-reality, and/or mixed-reality contexts. For example, delays exhibited by a positional tracking system may cause a head-mounted display to lag behind a user's actual physical movements. This lag (which is sometimes referred to as motion-to-photon latency) may represent a performance issue that impacts the user experience of many head-mounted displays that utilize GPU-driven positional tracking systems.

As a specific example of this deficiency, a traditional head-mounted display may include a GPU that is programmed to perform positional tracking based on image frames captured by one or more cameras of the head-mounted display. This GPU may be designed such that, after receiving the image frames from the cameras, the GPU temporarily stores and/or buffers the image frames in DRAM. The GPU may then perform a positional tracking algorithm for the head-mounted display based on the image frames stored in DRAM. In some examples, after and/or in-between various steps of the positional tracking algorithm, the GPU may access the image frames in DRAM and/or save information extracted from the image frames to DRAM.

As mentioned above, many head-mounted display systems may utilize positional tracking information while generating augmented-reality frames to be presented to a user. As such, delays in detecting movements of a head-mounted display may result in motion-to-photon latency and/or inaccuracies within the augmented-reality frames, especially with respect to the head-mounted display's position and/or orientation. Unfortunately, a traditional GPU-driven positional tracking system may incur delays or time penalties with each DRAM access (whether a read or a write). Thus, in this GPU-driven embodiment, the amount of time needed to generate augmented-reality frames may be prolonged and/or drawn out due at least in part to the general-purpose architecture of the GPU and/or its heavy reliance on the DRAM buffer.

In some applications (such as GPU-driven televisions or computer monitors), such delays may have little, if any, effect on the overall user experience. In fact, such delays may be entirely unnoticeable. However, in virtual-reality, augmented-reality, and/or mixed-reality contexts, such delays may be noticeable or even obvious to some users, potentially leading to a disjointed user experience that could leave them feeling ill.

To address this deficiency, head-mounted display 202 may include and/or incorporate special-purpose hardware device 100 (e.g., an SoC and/or ASIC), which performs many of the positional tracking operations that were traditionally the responsibility of GPUs. As will be explained in greater detail below, SoC- and/or ASIC-driven CV systems may outperform and/or improve upon traditional GPU-driven CV systems for various reasons.

Figure 4:
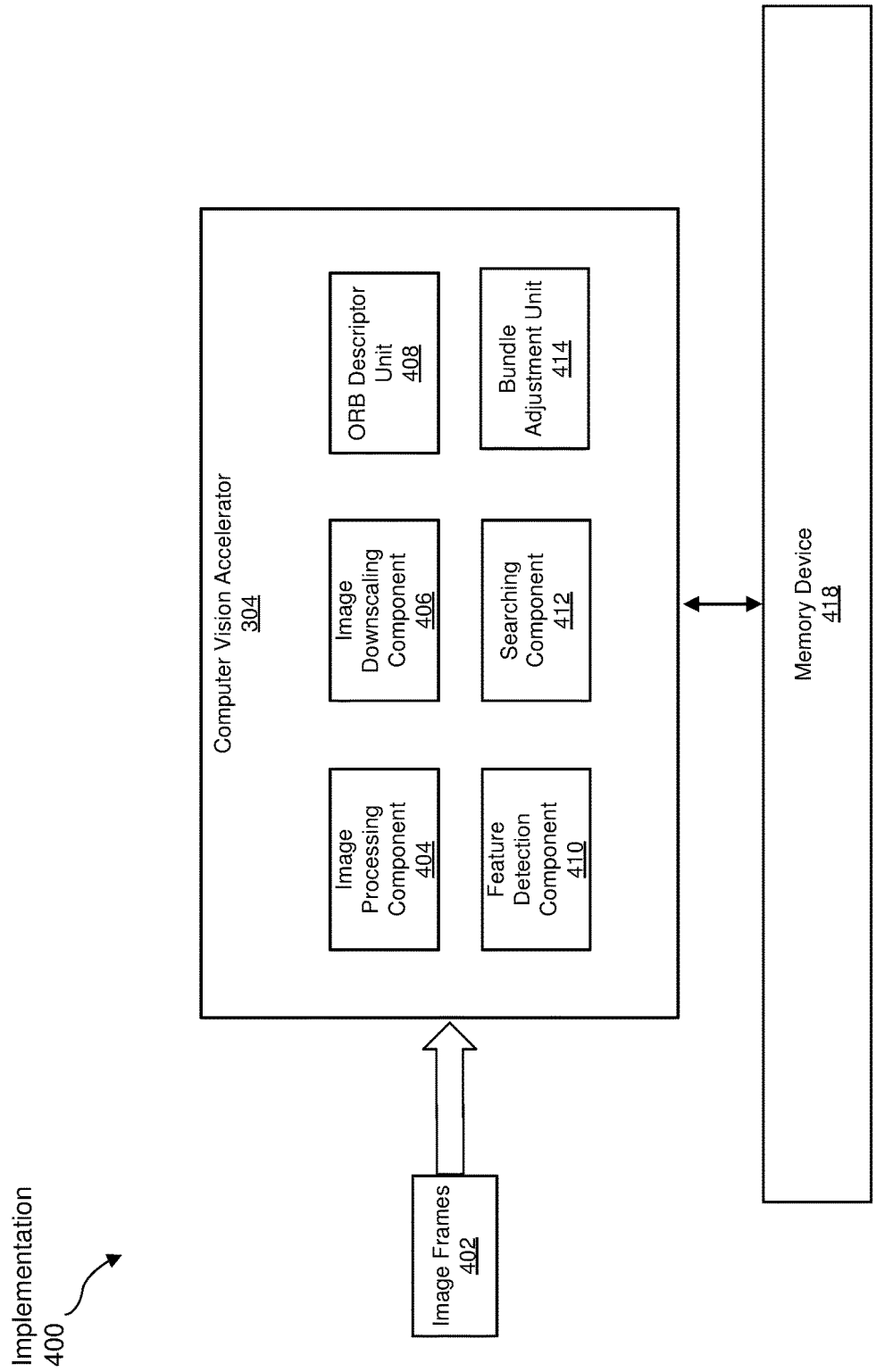
FIG. 4 is a block diagram of an exemplary implementation for accelerating positional tracking of head-mounted displays in accordance with some embodiments.

FIG. 4 illustrates an exemplary implementation 400 of positional tracking component 104 for accelerating positional tracking of head-mounted displays in accordance with some embodiments. As illustrated in FIG. 4, implementation 400 may include CV accelerator 304, image frames 402, and a memory device 418. Memory device 418 generally represents any type or form of volatile or non-volatile storage device or medium capable of storing data and/or computer-readable instructions. In one example, memory device 418 may include and/or represent a DRAM device and/or buffer. Additional examples of memory device 418 include, without limitation, Random Access Memory (RAM), Read Only Memory (ROM), flash memory, Solid-State Drives (SSDs), optical drives, caches, variations or combinations of one or more of the same, and/or any other suitable storage memory.

As illustrated in FIG. 4, CV accelerator 304 may include an image processing component 404, an image downscaling component 406, an oriented FAST and rotated BRIEF (ORB) descriptor unit 408, a feature detection component 410, a searching component 412, and a bundle adjustment unit 414. All or a portion of these units and components may be dedicated to performing one or more steps of a positional tracking algorithm. In addition, these components and units may be implemented within hardware and/or software. For example, image processing component 404, image downscaling component 406, feature detection component 410, and/or searching component 412 may be implemented solely or predominantly in hardware. This hardware-based implementation may accelerate the operations or steps the components are tasked to perform. In contrast, ORB descriptor unit 408 and/or bundle adjustment unit 414 may be implemented solely or predominantly in software. This software-based implementation may enable these units to be programmably updated.

In implementation 400, image frames 402 generally represent image frames captured by one or more of cameras 210 of head-mounted display 202. As image frames 402 are received by special-purpose hardware device 100 (e.g., received by image signal processor 102 within special-purpose hardware device 100), special-purpose hardware device 100 may pass image frames 402 to CV accelerator 304. The components and units within CV accelerator 304 may then perform a positional tracking algorithm based on one or more of image frames 402. This positional tracking algorithm may detect changes in the position of head-mounted display 202. As part of and/or during this algorithm, the components and/or units of CV accelerator 304 may read and/or write data extracted from image frames 402 to memory device 418. In addition, CV accelerator 304 may store detected changes in the position of head-mounted display 202 within memory device 418. These changes may later be accessed by one or more additional components of special-purpose hardware device 100 (such as display imaging pipeline 310).

Figure 5:
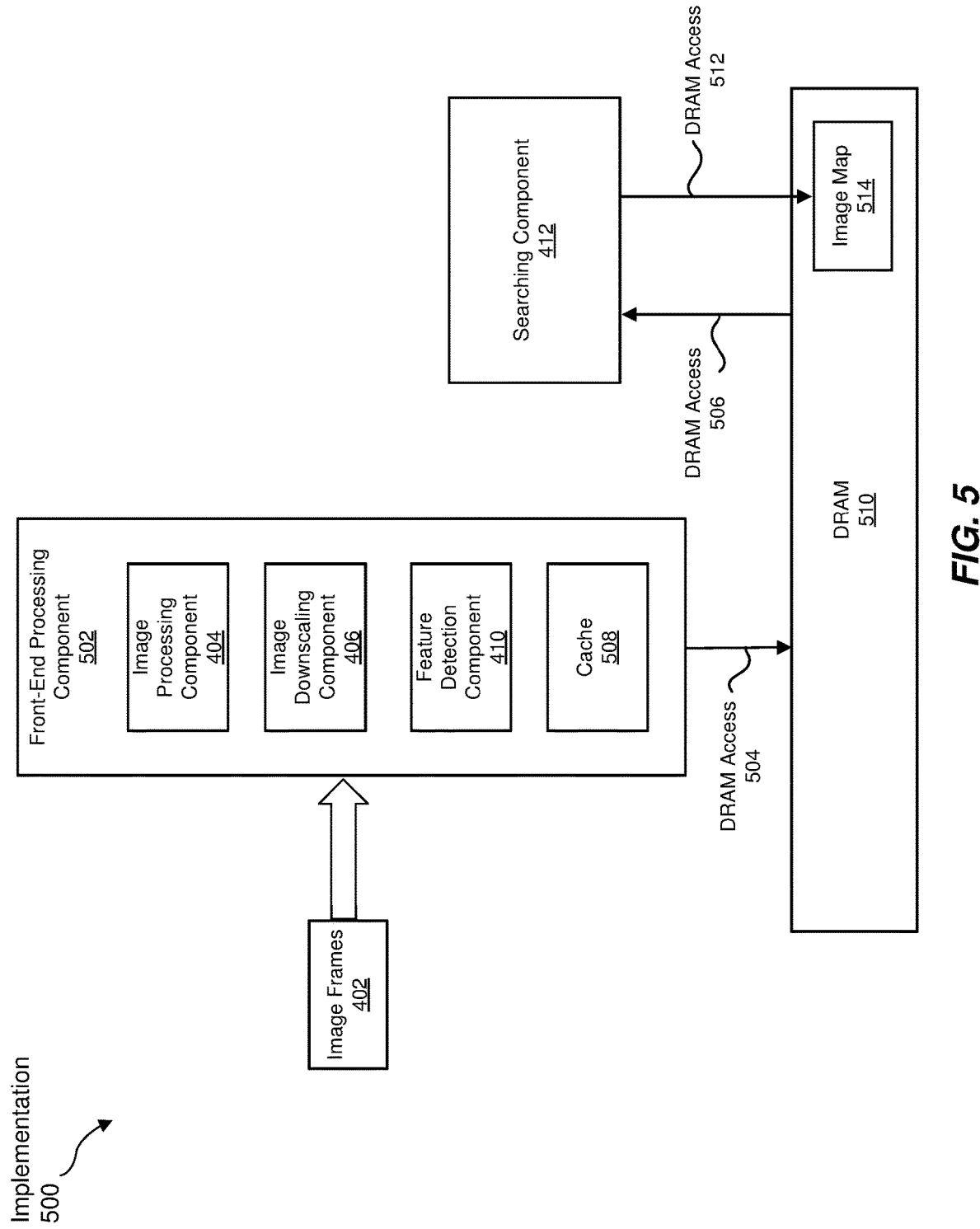
FIG. 5 is a block diagram of an exemplary implementation for accelerating positional tracking of head-mounted displays in accordance with some embodiments.

FIG. 5 illustrates an exemplary implementation 500 of CV accelerator 304 for accelerating positional tracking of head-mounted displays in accordance with some embodiments. Specifically, FIG. 5 illustrates a front-end processing component 502. Front-end processing component 502 generally represents any type or form of processing unit or device that analyzes all or a portion of image frames 402 as image frames 402 are received by CV accelerator 304. Specifically, front-end processing component 502 may perform one or more in-line operations on image frames 402 before image frames 402 are stored within a main memory (e.g., a DRAM 510) of special-purpose hardware device 100. In contrast, many traditional positional tracking systems may first store and/or buffer received image frames within a portion of DRAM or similar type of memory before processing the image frames. By avoiding this initial storing step, special-purpose hardware device 100 may reduce the time and/or computing resources involved in tracking positional changes of head-mounted display 202.

In one embodiment, front-end processing component 502 may represent a hardware-accelerated component. For example, front-end processing component 502 may represent an integrated device or circuit specifically designed and manufactured to perform initial image processing operations on incoming image frames.

In implementation 500, front-end processing component 502 may include image processing component 404, image downscaling component 406, feature detection component 410, and a cache 508. Front-end processing component 502 may include any additional or alternative processing unit, component, and/or portion of memory for any suitable purpose. For example, front-end processing component 502 may include ORB descriptor unit 408, searching component 412, and/or bundle adjustment unit 414 illustrated in FIG. 4.

Cache 508 generally represents any portion of fast-access memory or storage. For example, cache 508 may represent and/or include a portion of Static Random Access Memory (SRAM). In some embodiments, cache 508 may have a faster access time than DRAM 510. In other words, special-purpose hardware device 100 may more quickly read data stored within cache 508 than data stored within DRAM 510. In some examples, front-end processing component 502 may load image frames 402 into cache 508 as image frames 402 are received from cameras 210. One or more of the components of front-end processing component 502 may then perform one or more in-line image processing operations on image frames 402 within cache 508.

In one embodiment, image processing component 404 may represent and/or include a lightweight image signal processor. In this embodiment, image processing component 404 may process image frames 402 using image signal processes such as Gamma correction, Guassian blurring, and/or acoustic emission signal processing. Such processes may enable additional components of front-end processing component 502 to more efficiently and/or accurately analyze and/or further process image frames 402.

In one example, image processing component 404 may pass processed versions of image frames 402 to image downscaling component 406. In other examples, image downscaling component 406 may receive images frames 402 directly from image signal processor 102 (thus bypassing the processing operations performed by image processing component 404). After receiving image frames 402, image downscaling component 406 may generate one or more low-resolution versions of image frames 402. For example, image downscaling component 406 may sample image frames 402 and/or otherwise reduce the resolution image frames 402.

In some embodiments, image downscaling component 406 may generate multiple downscaled versions of image frames 402. Each of these downscaled versions of image frames 402 may be of different resolutions. As an example, if one of image frames 402 is originally composed of 256 pixels, image processing component 404 may downscale the image frame to 128 pixels, 64 pixels, and 32 pixels (creating four total versions of the image frame). Such a process of generating multiple downscaled versions of an image frame may be referred to as generating a pyramid of the image frame. After performing a pyramid-generation process on one of image frames 402, image downscaling component 406 may write the resulting image frames to DRAM 510 (e.g., via a DRAM access 504).

Feature detection component 410 within front-end processing component 502 generally represents any hardware-accelerated component, integrated circuit, and/or device dedicated to detecting one or more features within image frames 402. In some embodiments, the term "feature" may refer to a physical object and/or a portion of a physical object within a physical environment surrounding a head-mounted display. For example, a feature may represent a point or a corner of a physical object that is visually distinct within the object and/or visually distinct from adjacent objects.

Feature detection component 410 may detect features within an image frame in a variety of ways. In one example, feature detection component 410 may identify one or more features within an image frame by performing a nonmaxima suppression analysis of the image frame. This analysis may involve calculating the gradient of pixel values within the image frame and then identifying a location within the image frame at which the pixel value gradient is higher (e.g., steeper) than a certain threshold and/or higher than pixel value gradients of surrounding locations. Feature detection component 410 may detect features within image frames 402 using any additional or alternative image processing technique.

In some examples, feature detection component 410 may identify a set of key features within image frames 402. According to certain embodiments, the term "key feature" may generally refer to a feature that has been selected for tracking and/or analysis as part of a positional tracking algorithm. In some embodiments, feature detection component 410 may identify and then track a certain number of key features (such as 20 key features). In these embodiments, after compiling a set of key features, CV accelerator 304 may attempt to identify representations of each of the key features within incoming image frames.

Feature detection component 410 may detect key features in a variety of ways. In one embodiment, feature detection component 410 may identify a key feature by detecting a feature that is particularly distinct (e.g., compared to other features within an image frame). Additionally or alternatively, feature detection component 410 may identify a key feature by detecting a new feature within one or more of image frames 402. For example, feature detection component 410 may search incoming image frames for features that have not yet been identified and stored within DRAM 510. In one embodiment, feature detection component 410 may search for new features within each image frame received by front-end processing component 502. In other embodiments, feature detection component 410 may search for new features within certain key image frames (e.g., every third image frame received by front-end processing component 502).

In one example, searching component 412 may incorporate one or more key features into an image map, such as an image map 514 shown in FIG. 5. In some embodiments, the term "image map" may refer to a representation or description of physical locations (e.g., three-dimensional positions) of one or more key features within a physical environment. In one example, image map 514 may indicate the absolute physical location of a key feature. For example, image map 514 may indicate the position of the key feature within a room or other area surrounding head-mounted display 202. Additionally or alternatively, image map 514 may indicate the relative physical location of a key feature. For example, image map 514 may indicate the distance and/or orientation of the key feature with respect to head-mounted display 202.

Searching component 412 may calculate the physical location of a key feature in a variety of ways. In one embodiment, searching component 412 may perform an epipolar search for the three-dimensional location of a key feature. In some examples, the term "epipolar search" may refer to any type or form of analysis that identifies a three-dimensional location of an object within a physical environment based on multiple two-dimensional representations (e.g., images) of the physical environment.

In the example of FIG. 5, searching component 412 may contain and/or represent a hardware-accelerated component at least partially dedicated to performing epipolar searches. In this example, searching component 412 may identify the physical location of a key feature by performing an epipolar search based on two or more of image frames 402 that contain representations of the key feature. Searching component 412 may then incorporate the location of the key feature into image map 514.

In some embodiments, searching component 412 may incorporate key features into image map 514 as feature detection component 410 detects the key features within image frames 402. In addition, searching component 412 may remove a key feature from image map 514 for a variety of reasons, such as determining that a new key feature has been identified, determining that the key feature is no longer represented within incoming image frames, and/or after a certain amount of time has lapsed since the key feature was incorporated into image map 514. As will be explained in greater detail below, by maintaining an image map of the physical locations of features within a physical environment surrounding head-mounted display 202, CV accelerator 304 may track the position and/or orientation of head-mounted display 202 within the physical environment.

In implementation 500, searching component 412 may both read and write data to and from DRAM 510. In one embodiment, searching component 412 may read (e.g., via a DRAM access 506) the downscaled versions of image frames 402 that were generated and stored by image downscaling component 406 and/or the key features that were detected and stored by feature detection component 410. In addition, searching component 412 may write (e.g., via a DRAM access 512) the location of a key feature to image map 514. In contrast, because front-end processing component 502 performs initial in-line processing operations of image frames 402, front-end processing component 502 may avoid and/or reduce reading from DRAM 510.

Figure 6:
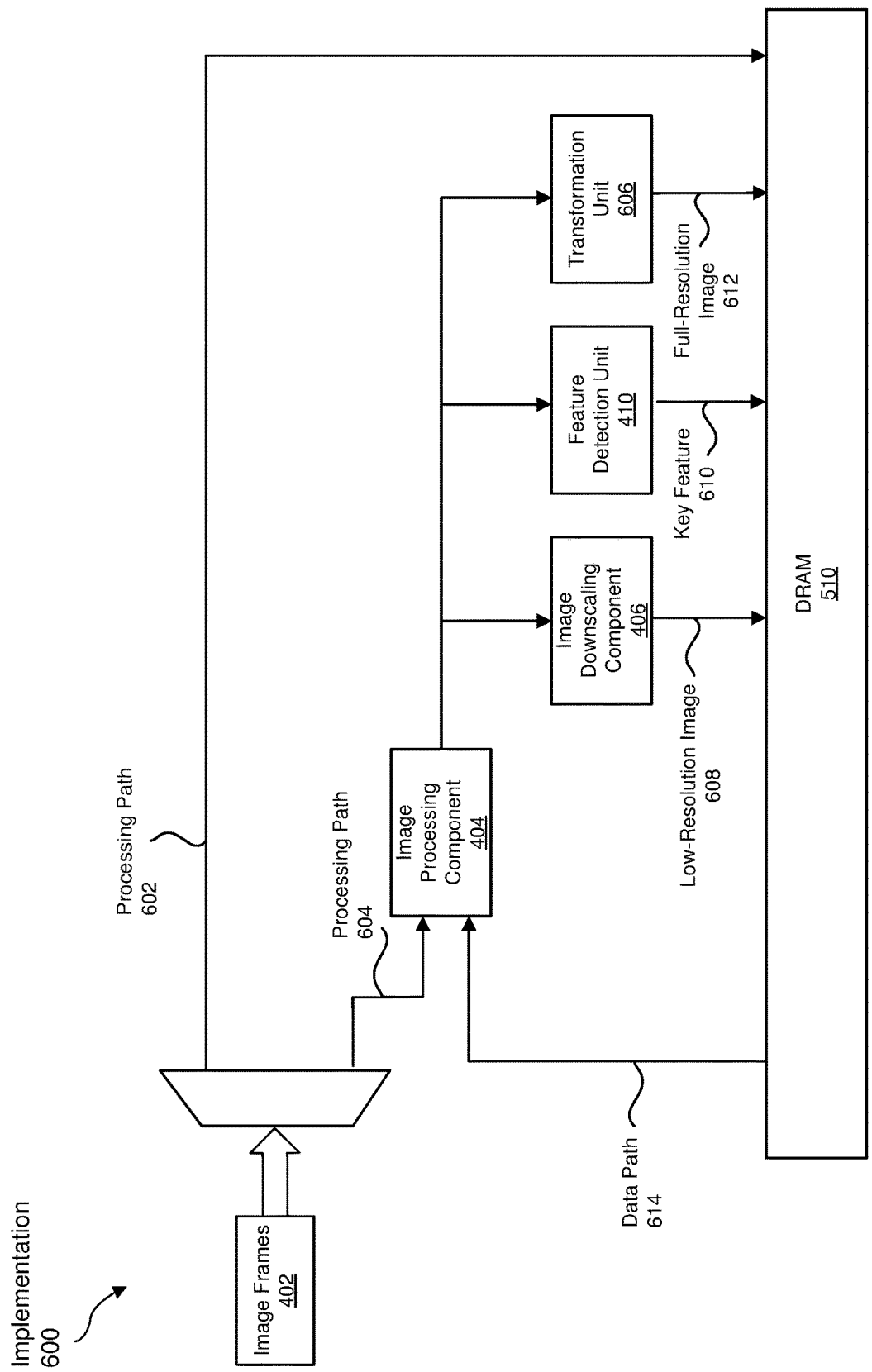
FIG. 6 is a block diagram of an exemplary implementation for accelerating positional tracking of head-mounted displays in accordance with some embodiments.

FIG. 6 illustrates an exemplary implementation 600 of front-end processing component 502 in accordance with some embodiments. Specifically, FIG. 6 illustrates the flow of image frames 402 as image frames 402 are processed by front-end processing component 502. In this example, front-end processing component 502 may contain two distinct processing paths along which image frames 402 may be directed. In one embodiment, front-end processing component 502 may direct one or more of image frames 402 along a processing path 602. Processing path 602 may involve writing image frames 402 directly to main memory (e.g., DRAM 510). In some examples, processing path 602 may represent and/or be similar to processing paths of traditional positional tracking systems that buffer incoming image frames within DRAM before processing the image frames. Alternatively, front-end processing component 502 may direct all or a portion of image frames 402 along a processing path 604. Processing path 604 may involve performing one or more in-line operations on image frames 402 before image frames 402 are written to DRAM 510 (as discussed above in connection with FIG. 5).

As shown in FIG. 6, processing path 604 may pass image frames 402 to image processing component 404. After image processing component 404 performs one or more image signal processing operations (such as Gamma correction and/or Gaussian blurring) on image frames 402, image processing component 404 may pass the processed image frames to image downscaling component 406, feature detection component 410, and/or a transformation unit 606. In some embodiments, image downscaling component 406, feature detection component 410, and transformation unit 606 may simultaneously process and/or analyze image frames 402. For example, these components and units may work independently and/or in parallel.

As discussed in connection with FIG. 5, image downscaling component 406 may generate one or more low-resolution versions of an incoming image frame. In the example of FIG. 6, image downscaling component 406 may generate a low-resolution image 608 and then write low-resolution image 608 to DRAM 510. In addition, feature detection component 410 may detect one or more key features within an incoming image frame. In the example of FIG. 6, feature detection component 410 may detect a key feature 610 and then write an indication of key feature 610 to DRAM 510 (such as by storing the pixel values of pixels within key feature 610).

In some examples, processing path 604 may optionally include passing image frames 402 from image processing component 404 to transformation unit 606. Transformation unit 606 generally represents any hardware-accelerated component that is dedicated to transforming and/or processing a full-resolution version of an image frame before writing the full-resolution version to DRAM 510. In one embodiment, transformation unit 606 may perform a finite Legendre transform (FLT) on an incoming image frame. Transformation unit 606 may then write the resulting image frame (i.e., a full-resolution image 612) to DRAM 510. Transformation unit 606 may perform any additional or alternative image processing and/or image transformation algorithm on image frames 402.

In some embodiments, special-purpose hardware device 100 may pass one or more of image frames 402 through front-end processing component 502 multiple times. For example, after image downscaling component 406 generates low-resolution image 608, special-purpose hardware device 100 may forward low-resolution image 608 along data path 614. Data path 614 may direct low-resolution image 608 through image processing component 404 and/or feature detection component 410. In some examples, feature detection component 410 may re-calculate the presence and/or location of key feature 610 within low-resolution image 608. Feature detection component 410 may then store the resulting low-resolution version of key feature 610 within DRAM 510. In some embodiments, front-end processing component 502 may pass each low-resolution version of an image frame generated by image downscaling component 406 along data path 614.

In some examples, special-purpose hardware device 100 may include multiple instances of front-end processing component 502. For example, special-purpose hardware device 100 may include one instance of front-end processing component 502 for each of cameras 210. In this way, CV accelerator 304 may simultaneously process and/or analyze image frames received from each camera. In these examples, each instance of front-end processing component 502 may write data about incoming image frames to the same portion of DRAM (i.e., DRAM 510).

Figure 7:
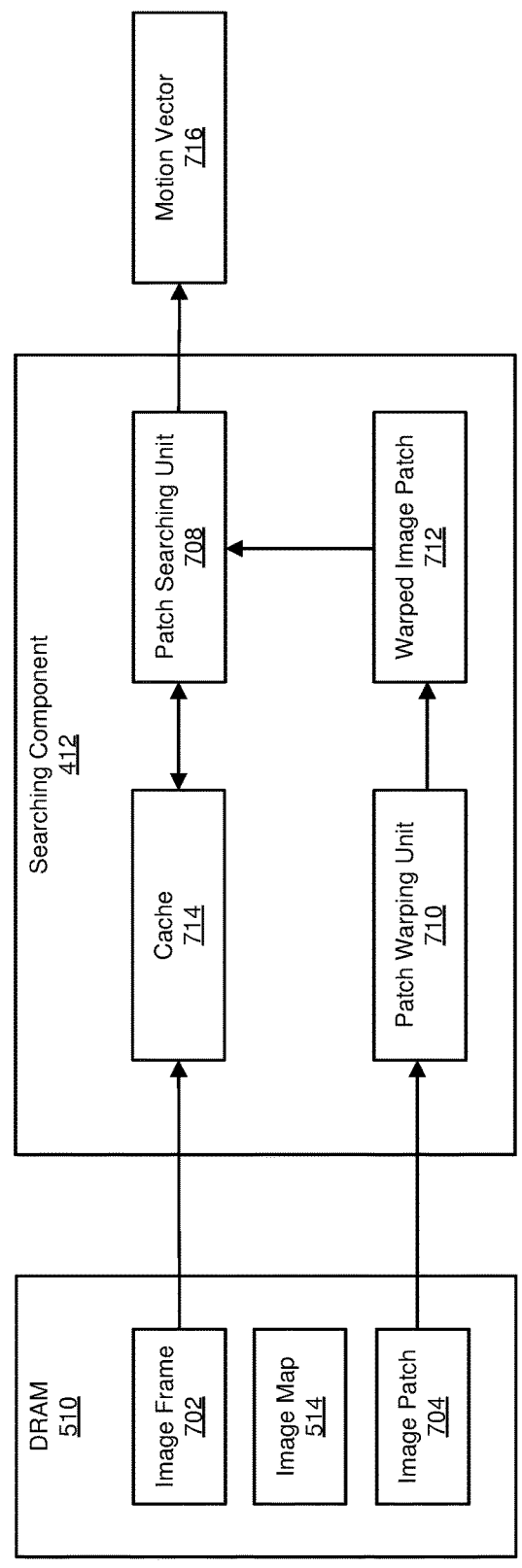
FIG. 7 is a block diagram of an exemplary implementation for accelerating positional tracking of head-mounted displays in accordance with some embodiments.

FIG. 7 illustrates an exemplary implementation 700 of searching component 412 in accordance with some embodiments. In this example, searching component 412 may represent a software- and/or hardware-based component of CV accelerator 304 that is dedicated to determining locations of representations of key features within image frames 402. In some embodiments, the term "representation of a key feature" may refer to a depiction and/or image of a key feature within an image frame. Accordingly, the location of a representation of a key feature may refer to the location of pixels within an image frame that depict the key feature (rather than the location of the key feature within a physical environment).

In implementation 700, searching component 412 may identify the location of the representation of key feature 610 within an image frame 702. Image frame 702 generally represents any image frame received and/or processed by front-end processing component 502. For example, image frame 702 may represent full-resolution image 612 and/or low-resolution image 608 in FIG. 6. In some embodiments, searching for the representation of key feature 610 within both a high-resolution image frame and one or more low-resolution image frames may facilitate more accurate and/or precise tracking of the position of head-mounted display 202.

As shown in FIG. 7, searching component 412 may access image frame 702 within DRAM 510. Searching component 412 may also access one or more image patches within DRAM 510, such as an image patch 704. In some embodiments, the term "image patch" may refer to a representation, depiction, and/or image of a key feature. For example, an image patch may contain and/or represent the portion of an image frame that depicts a particular key feature. In one example, an image patch may represent the physical appearance of a key feature from a particular perspective and/or view. For example, image patch 704 may represent and/or indicate the physical appearance of key feature 610 at a particular angle and/or at a particular distance relative to head-mounted display 202.

In some embodiments, CV accelerator 304 may generate and/or store multiple image patches for each key feature incorporated into image map 514. Each of these image patches may represent a key feature at a distinct perspective. In addition, CV accelerator 304 may generate and/or store image patches of various resolutions.

As shown in FIG. 7, searching component 412 may include a patch searching unit 708 and a patch warping unit 710. In one example, patch warping unit 710 may load and/or access image patch 704 within DRAM 510. Patch warping unit 710 may then warp image patch 704 such that image patch 704 resembles and/or matches a current physical appearance of key feature 610. In implementation 700, this warping process may generate a warped image patch 712.

In one embodiment, patch warping unit 710 may generate warped image patch 712 by adjusting and/or altering one or more pixels within image patch 704 such that image patch 704 more closely resembles the current physical appearance of key feature 610 (e.g., the appearance of key feature 610 from the current perspective of head-mounted display 202) compared to the appearance of key feature 610 depicted within image patch 704. Patch warping unit 710 may perform this warping using any type or form of image processing technique, such as anti-aliasing filtering and/or pixel interpolation.

After patch warping unit 710 generates warped image patch 712, patch searching unit 708 may identify the location of the representation of key feature 610 within image frame 702 based on warped image patch 712. In some examples, patch searching unit 708 may identify this location while analyzing image frame 702 within a cache, buffer, and/or other portion of fast-access memory. In implementation 700, patch searching unit 708 may load all or a portion of image frame 702 from DRAM 510 into a cache 714. In this example, cache 714 may represent a cache dedicated to and/or accessible by searching component 412 (as opposed to cache 508 in FIG. 5, which may be contained within front-end processing component 502).

Patch searching unit 708 may search for the location of the representation of key feature 610 within image frame 702 in a variety of ways. In some examples, patch searching unit 708 may identify a location within image frame 702 at which pixel values of warped image patch 712 most closely match corresponding pixel values of image frame 702. In some embodiments, the term "pixel value" may refer to a numerical value that represents and/or indicates the brightness and/or color of a pixel.

Patch searching unit 708 may implement a variety of algorithms and/or image processing techniques to accurately and/or efficiently compare the pixel values of warped image patch 712 with the pixels values of image frame 702. In some examples, patch searching unit 708 may implement a sum of squared differences (SSD) algorithm or similar type of algorithm. In one embodiment, performing this SSD algorithm may represent an initial analysis. Patch searching unit 708 may refine this initial analysis using techniques such as pixel interpolation, parabola fitting, and/or a Kanade-Lucas-Tomasi (KLT) feature tracking algorithm. In some embodiments, performing these subsequent analyses may enable patch searching unit 708 to identify a sub-pixel location at which the representation of key feature 610 is located within image frame 702. Furthermore, in some examples, patch searching unit 708 may perform multiple iterations (e.g., four iterations) of one or more of the above-mentioned analyses, thereby improving the precision and/or accuracy of the location of the representation of key feature 610.

Although FIG. 7 illustrates only warped image patch 712, searching component 412 may generate and/or utilize any additional or alternative image patch. For example, patch warping unit 710 may generate multiple warped image patches that each represent the physical appearance of key feature 610 from a distinct perspective and/or at a distinct resolution. Patch searching unit 708 may then search image frame 702 for the representation of key feature 610 based on all or a portion of these warped image patches.

As shown in FIG. 7, patch searching unit 708 may output a motion vector 716. Motion vector 716 generally represents and/or indicates any type or form of discrepancy between the determined location of the representation of key feature 610 within image frame 702 and an expected location of the representation. For example, motion vector 716 may indicate an offset between the location of the representation of key feature 610 within image frame 702 and the location of the representation of key feature 610 within a previously-received image frame. In some embodiments, searching component 412 may use motion vector 716 to predict and/or estimate the location of a representation of key feature 610 within a subsequent image frame.

After determining the location of the representation of key feature 610 within image frame 702, searching component 412 may determine the current physical location of head-mounted display 202. For example, searching component 412 may infer and/or calculate the position of head-mounted display 202 within image map 514. This position may correspond to and/or indicate the most up-to-date physical location of head-mounted display 202 within the physical environment described by image map 514. Searching component 412 may determine this position in a variety of ways. In one embodiment, based on tracking the representation of key feature 610 (or representations of a set of key features) across multiple image frames, searching component 412 may determine that head-mounted display 202 has physically changed location with respect to key feature 610. Searching component 412 may determine the amount and/or direction that head-mounted display 202 has moved based on motion vector 716, the physical position of key feature 610 indicated by image map 514, and/or any additional or alternative positional data.

In some examples, searching component 412 may pass the current physical location and/or change in physical location of head-mounted display 202 to one or more additional components of special-purpose hardware device 100 (such as display imaging pipeline 310). For example, searching component 412 may store an indication of the current physical location of head-mounted display 202 within DRAM 510. Additionally or alternatively, searching component 412 may directly forward the current physical location of head-mounted display 202 to display imaging pipeline 310. In some examples, searching component 412 may continue to detect changes in the position of head-mounted display 202 and/or update the current position of head-mounted display 202 based on new image frames received by CV accelerator 304.

In some embodiments, one or more components of searching component 412 may be dedicated to performing multiple steps of a positional tracking algorithm. For example, as discussed above, searching component 412 may perform an epipolar search to identify a physical location of a key feature within the physical environment surrounding head-mounted display 202. In one embodiment, patch searching unit 708 within searching component 412 may perform this search. Accordingly, patch searching unit 708 may be dedicated to performing both image patch searches and epipolar searches. For example, patch searching unit 708 may represent and/or include a hardware-accelerated component designed to efficiently perform mathematical operations involved in both types of searches. By dedicating and/or reusing certain components of special-purpose hardware device 100 for multiple functions, the disclosed positional tracking systems may reduce both the power consumption and on-chip space of special-purpose hardware device 100.

As mentioned above, patch searching unit 708 may load all or a portion of image frame 702 into cache 714. In one embodiment, patch searching unit 708 may load (and then search) a particular portion of image frame 702 into cache 714. This portion of image frame 702 may be referred to as a tile. In some embodiments, the term "tile" may refer to a region of an image frame that is expected to contain the representation of one or more key features.

Figure 8:
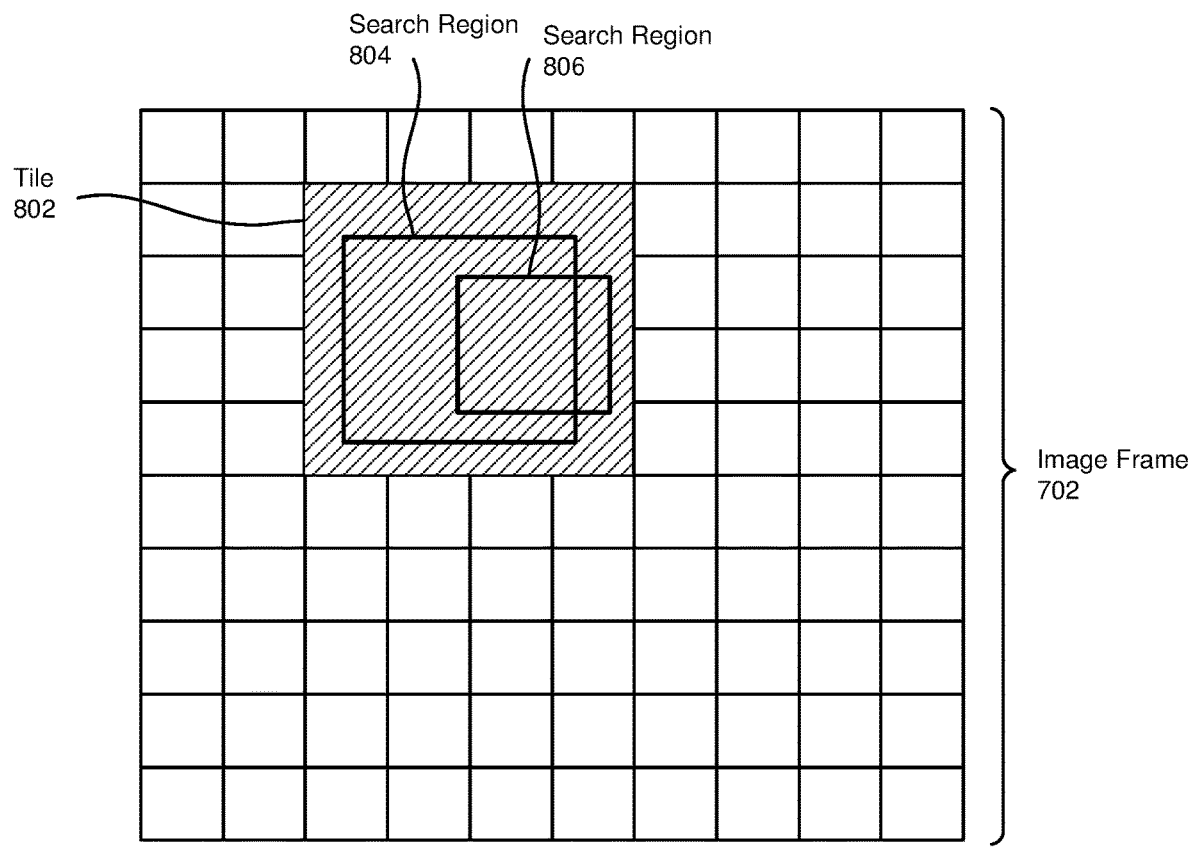
FIG. 8 is an illustration of an exemplary image frame that is utilized by a special-purpose hardware device to detect changes in the position of a head-mounted display in accordance with some embodiments.

FIG. 8 illustrates an exemplary tile 802 within image frame 702. As shown in FIG. 8, tile 802 may contain a search region 804 and a search region 806. In this example, search region 804 may represent a region of image frame 702 in which the representation of key feature 610 is expected to be located. For example, searching component 412 may determine that a representation of key feature 610 was found within a corresponding and/or similar region within a previously received image frame. As such, searching component 412 may determine that the current representation of key feature 610 is likely within and/or nearby this previously identified region.

In the example of FIG. 8, searching component 412 may determine that a representation of an additional key feature is likely to be located within search region 806. In addition, searching component 412 may determine that search region 804 and search region 806 at least partially overlap and/or are within a certain proximity of each other. Accordingly, searching component 412 may select and/or allocate tile 802 such that tile 802 encompasses both search region 804 and search region 806. Searching component 412 may then load tile 802 into cache 714. In this way, searching component 412 may identify both the location of the representation of key feature 610 and the location of the representation of the additional key feature based on the data loaded into the cache. By dividing image frame 702 into tiles, searching component 412 may ensure that each portion of image frame 702 is loaded into cache only a single time, thereby reducing both the time and computing resources involved in tracking key features within image frames.

As discussed above in connection with FIG. 2, head-mounted display 202 may include and/or be equipped with an IMU 208. In some examples, IMU 208 may pass inertial measurement data to special-purpose hardware device 100. For example, IMU 208 may periodically or continuously monitor inertial changes of head-mounted display 202 while a user is operating head-mounted display 202. IMU 208 may then forward this data in real-time to one or more components of special-purpose hardware device 100, such as CV accelerator 304 and/or display imaging pipeline 310.

In some embodiments, special-purpose hardware device 100 may utilize inertial measurement data generated by IMU 208 to detect changes in the position and/or orientation of head-mounted display 202. For example, inertial measurement data provided by IMU 208 may indicate the velocity and/or acceleration at which head-mounted display 202 is moving and/or changing direction. By processing (e.g., integrating) the data provided by IMU 208, CV accelerator 304 and/or display imaging pipeline 310 may determine the position of head-mounted display 202 relative to an initial position. In some embodiments, special-purpose hardware device 100 may combine and/or compare the inertial measurement data provided by IMU 208 with the feature-tracking data generated by searching component 412. In this way, special-purpose hardware device 100 may more accurately and/or efficiently determine the physical location of head-mounted display 202.

Figure 9:
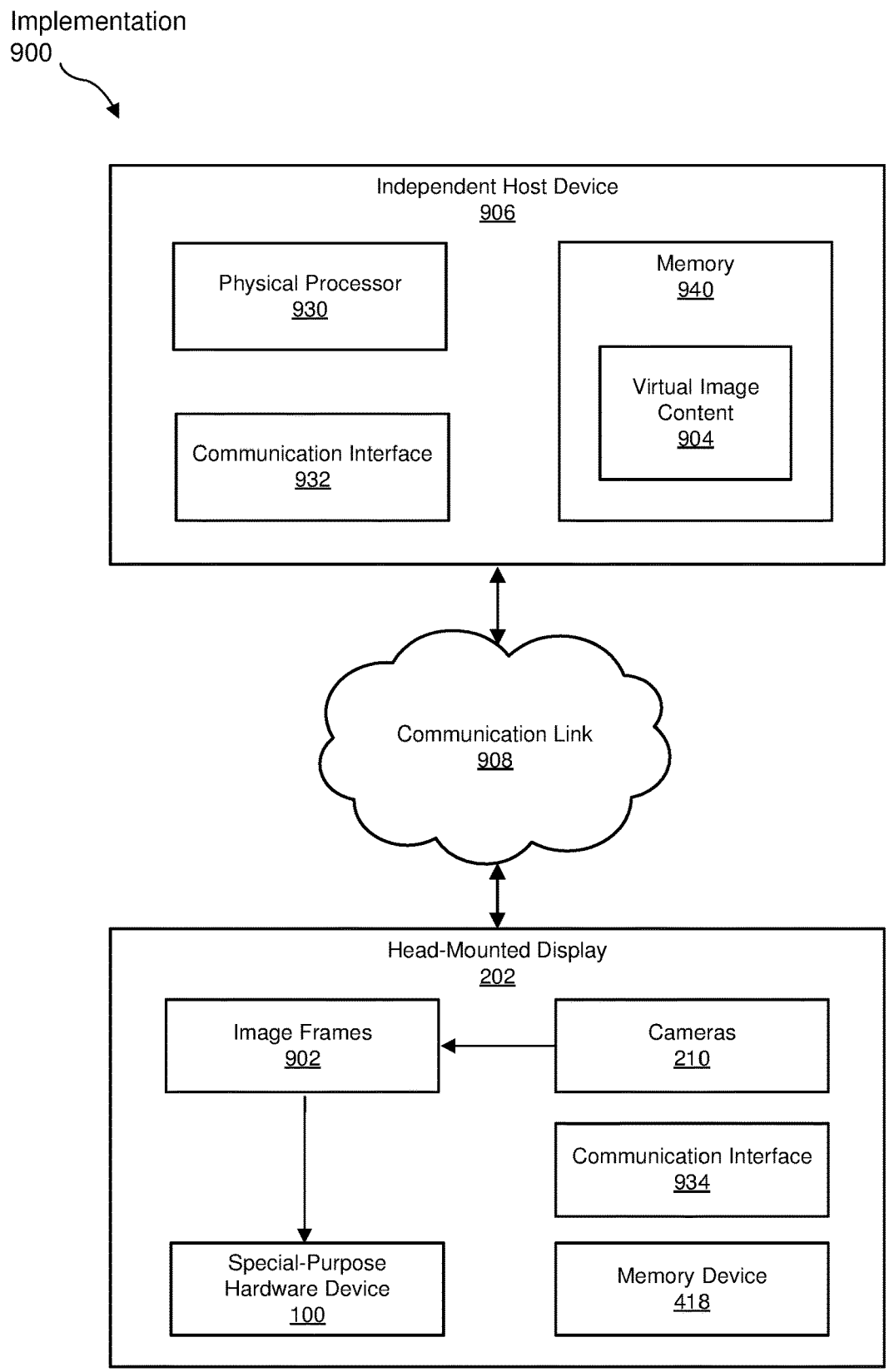
FIG. 9 is a block diagram of an exemplary implementation for accelerating positional tracking of head-mounted displays in accordance with some embodiments.

FIG. 9 illustrates an exemplary implementation 900 of special-purpose hardware device 100 for accelerating positional tracking of head-mounted displays in accordance with some embodiments. As illustrated in FIG. 9, implementation 900 may include and/or involve head-mounted display 202 and an independent host device 906 in communication with one another via a communication link 908. In one example, independent host device 906 may represent an external device that provides computer-generated imagery (such as virtual image content 904) to be overlaid onto image frames captured by head-mounted display 202. For example, independent host device 906 may provide imagery used by special-purpose hardware device 100 to generate mixed-reality and/or augmented-reality frames. In implementation 900, independent host device 906 may represent a Personal Computer (PC) and/or gaming console. In this example, independent host device 906 may include a physical processor 930, a communication interface 932, and memory 940.

As illustrated in FIG. 9, head-mounted display 202 may include special-purpose hardware device 100, cameras 210, a communication interface 934, and memory device 418. In one example, independent host device 906 and head-mounted display 202 may establish and/or form communication link 908 with one another by way of communication interfaces 932 and 934, respectively. In this example, one or more of cameras 210 on head-mounted display 202 may capture image frames 902. Image frames 902 may be captured from the perspective of a user wearing head-mounted display 202. In one embodiment, image frames 902 may be distinct from image frames 402 that are captured for use in tracking the position of head-mounted display 202.

In one example, independent host device 906 may feed computer-generated imagery to head-mounted display 202 via communication link 908 so that head-mounted display 202 is able to blend this imagery with image frames 902. The resulting experience may appear to the user as a mixture of reality and virtual-reality. Accordingly, head-mounted display 202 may effectively serve as a see-through camera that enables the user to view his or her surroundings as modified by virtual objects fed from the independent host device 906.

While generating mixed-reality and/or augmented-reality frames, special-purpose hardware device 100 may identify the current position and/or orientation of head-mounted display 202 based on information generated and/or output by CV accelerator 304. For example, display imaging pipeline 310 within special-purpose hardware device 100 may access current positional information of head-mounted display 202 within DRAM 510. In some embodiments, this information may enable display imaging pipeline 310 to more efficiently and/or accurately overlay computer-generated imagery provided by independent host device 906 onto image frames 902.

As a specific use-case example, a user may wear and/or operate head-mounted display 202 in his or her living room. In this example, head-mounted display 202 may capture video of his or her surroundings (including, e.g., living room furniture) and then blend that video with virtual objects fed from a nearby PC. After completion of the corresponding processing and/or blending, the video displayed to the user within head-mounted display 202 may show and/or render a virtual cover (or so-called skin) over his or her couch in the living room, thereby manipulating the appearance of the couch from the user's perspective. Based on precise and real-time positional information of head-mounted display 202 provided by CV accelerator 304, special-purpose hardware device 100 may accurately and efficiently adjust and/or display virtual content, such as the size and/or position of the virtual cover within the video. Thus, the disclosed apparatuses and systems may improve the overall experience of a user wearing head-mounted display 202.

Figure 10:
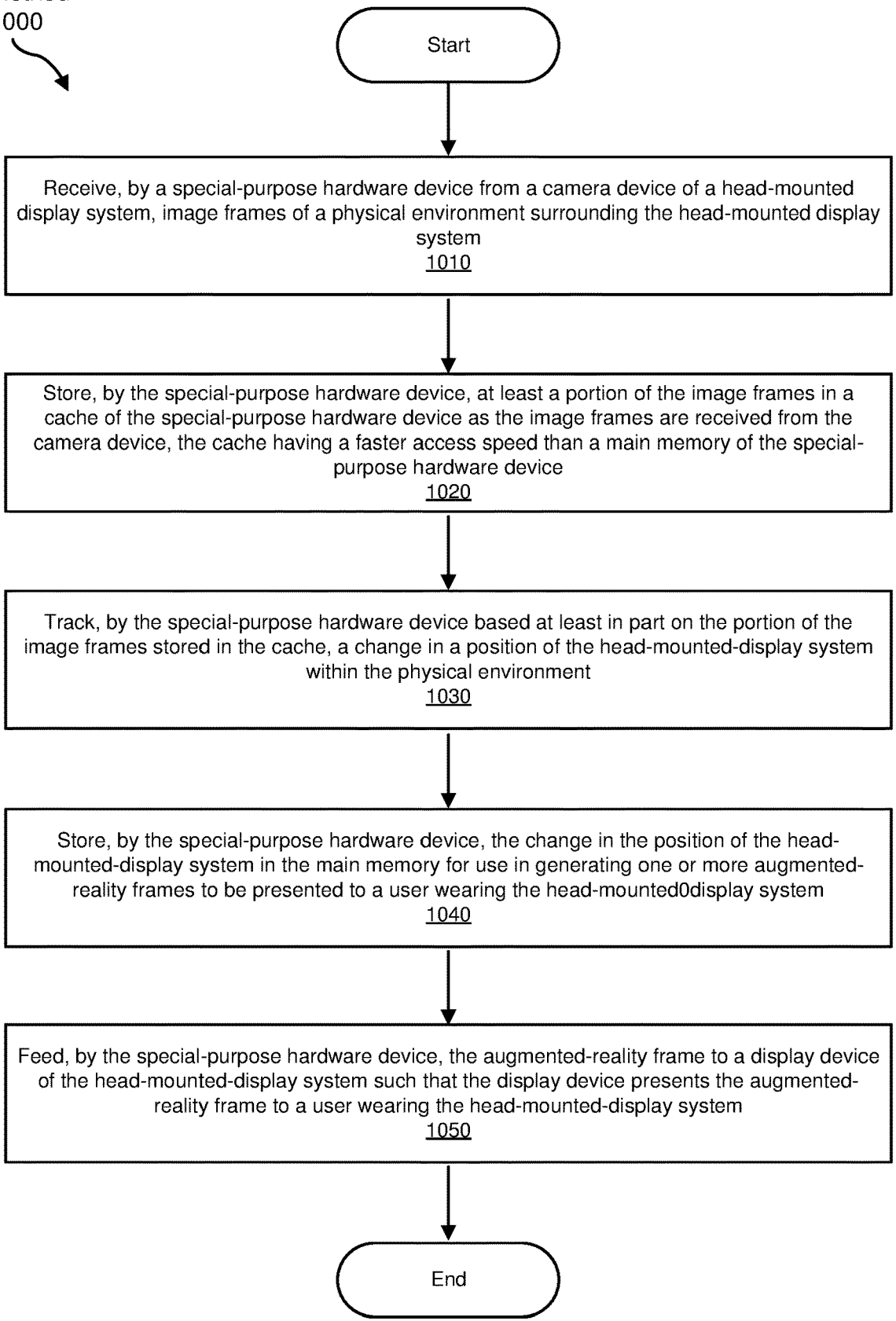
FIG. 10 is a flow diagram of an exemplary method for accelerating positional tracking of head-mounted displays in accordance with some embodiments.

FIG. 10 is a flow diagram of an exemplary method 1000 for accelerating positional tracking of head-mounted displays according to any of the embodiments disclosed herein. The steps shown in FIG. 10 may be performed by a special-purpose hardware device (such as an ASIC or SoC) incorporated into a head-mounted display. Moreover, the steps shown in FIG. 10 may also incorporate and/or involve various sub-steps and/or variations consistent with the descriptions described above in connection with FIGS. 1-9.

As illustrated in FIG. 10, at step 1010, a special-purpose hardware device may receive, from a camera device of a head-mounted-display system, image frames of a physical environment surrounding the head-mounted-display system. For example, cameras 210 may capture image frames 402 and then forward the same to special-purpose hardware device 100. As image frames 402 arrive, special-purpose hardware device 100 may receive and/or process image frames 402 as part of and/or in preparation for a positional tracking algorithm.

At step 1020 in FIG. 10, the special-purpose hardware device may store at least a portion of the image frames in a cache of the special-purpose hardware device as the image frames are received from the camera device. For example, special-purpose hardware device 100 may store image frames 702 within cache 508 of front-end processing component 502. In this example, cache 508 may have a faster access time than DRAM 510.

At step 1030 in FIG. 10, the special-purpose hardware device may track, based at least in part on the portion of the image frames stored in the cache, a change in a position of the head-mounted-display system within the physical environment. For example, front-end processing component 502 of special-purpose hardware device 100 may identify a set of key features (including key feature 610) based on image frames 402 stored in cache 508. Searching component 412 may then track the position of head-mounted display 202 based at least in part on tracking locations of representations of key feature 610 across multiple image frames.

At step 1040 in FIG. 10, the special-purpose hardware device may store the change in the position of the head-mounted-display system in the main memory for use in generating at least one augmented-reality frame to be presented to a user wearing the head-mounted-display system. For example, searching component 412 may write current positional tracking information about head-mounted display 202 to DRAM 510. Display imaging pipeline 310 and/or additional components of special-purpose hardware device 100 may then generate augmented-reality frames using the information stored within DRAM 510.

At step 1050 in FIG. 10, the special-purpose hardware device may feed the augmented-reality frame to a display device of the head-mounted-display system such that the display device presents the augmented-reality frame to a user wearing the head-mounted-display system. For example, special-purpose hardware device 100 may pass and/or forward augmented-reality frames to display device 318 of head-mounted display 202. Upon receiving the augmented-reality frames, display device 318 may display the augmented-reality frames to user 204.

Embodiments of the instant disclosure may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, e.g., create content in an artificial reality and/or are otherwise used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A special-purpose hardware device comprising:
   a camera interface that receives, from a camera device of a head-mounted-display system, image frames of a physical environment surrounding the head-mounted-display system;
   a positional tracking component communicatively coupled to the camera interface, wherein the positional tracking component:
   processes at least a portion of the image frames in a hardware-accelerator that:
   detects one or more features of the physical environment within an incoming image frame as the incoming image frame is received; and
   passes the features to a main memory of the special-purpose hardware device to be incorporated into an image map that identifies physical locations of the features of the physical environment;
   tracks, based at least in part on the image map, a change in a position of the head-mounted-display system within the physical environment; and
   stores the change in the position of the head-mounted-display system for use in generating at least one augmented-reality frame to be presented to a user wearing the head-mounted-display system; and
   a frame-output interface communicatively coupled to the positional tracking component, wherein the frame-output interface feeds the augmented-reality frame to a display device of the head-mounted-display system for presentation to the user.

2. The special-purpose hardware device of claim 1, wherein the features of the physical environment represent at least portions of physical objects located within the physical environment.

3. The special-purpose hardware device of claim 2, wherein the positional tracking component identifies a set of key features within the physical environment to be used in tracking changes in the position of the head-mounted-display system.

4. The special-purpose hardware device of claim 3, wherein the positional tracking component tracks the change in the position of the head-mounted-display system by:
   identifying an initial location of a representation of at least one key feature of the physical environment within at least one of:
   an initial image frame captured by the camera device; or the image map;
identifying a subsequent location of a representation of the key feature of the physical environment within a subsequent image frame captured by the camera device; and
comparing the initial location of the representation of the key feature with the subsequent location of the representation of the key feature.

5. The special-purpose hardware device of claim 4, wherein the positional tracking component identifies the subsequent location of the representation of the key feature within the subsequent image frame by:
   determining an expected region of the subsequent image frame in which the key feature of the physical environment is likely to be represented based on at least one of:
      the initial location of the representation of the key feature within the initial image frame; or
      the image map; and
   identifying a specific location of the representation of the key feature within the subsequent image frame by searching the expected region of the subsequent image frame.

6. The special-purpose hardware device of claim 5, wherein the positional tracking component:
   generates one or more image patches that represent physical appearances of the key feature of the physical environment from distinct perspectives; and
   stores the image patches within the main memory of the special-purpose hardware device.

7. The special-purpose hardware device of claim 6, wherein the positional tracking component comprises an image searching unit that identifies the specific location of the representation of the key feature within the subsequent image frame by:
   warping at least one image patch such that the image patch resembles a current physical appearance of the key feature from a perspective at which the camera device captured the subsequent image frame; and
   identifying a location within the subsequent image frame at which pixel values of the warped image patch most closely match corresponding pixel values of the subsequent image frame.

8. The special-purpose hardware device of claim 7, wherein the image searching unit identifies the specific location of the representation of the key feature within the subsequent image frame by:
   performing a sub-pixel interpolation analysis of pixel values within the expected region of the subsequent image frame; and
   determining, based on the sub-pixel interpolation analysis, a sub-pixel location at which the pixel values of the warped image patch most closely match the corresponding pixel values of the subsequent image frame.

9. The special-purpose hardware device of claim 8, wherein the image searching unit:
   determines that an additional key feature of the physical environment is expected to be represented within the expected region of the subsequent image frame;
   loads the expected region of the subsequent image frame into a cache of the special-purpose hardware device; and
   identifies both the specific location of the representation of the key feature and a specific location of a representation of the additional key feature within the subsequent image frame by searching the expected region of the subsequent image frame within the cache of the special-purpose hardware device.

10. The special-purpose hardware device of claim 5, wherein the hardware-accelerator of the special-purpose hardware device comprises a hardware-accelerated searching component that is dedicated to both:
    identifying the specific location of the representation of the key feature within the subsequent image frame; and
    identifying a physical location of the key feature within the physical environment.

11. The special-purpose hardware device of claim 10, wherein the hardware-accelerated searching component identifies the physical location of the key feature within the physical environment by:
    identifying specific locations of representations of the key feature within previous image frames captured by the camera device; and
    performing an epipolar search for a three-dimensional location of the key feature within the physical environment based on the specific locations of the representations of the key feature within the previous image frames.

12. The special-purpose hardware device of claim 1, wherein the hardware-accelerator of the special-purpose hardware device comprises a hardware-accelerated image processing component that:
    creates at least one low-resolution version of the incoming image frame as the incoming image frame is received at the hardware-accelerated image processing component; and
    passes the low-resolution version of the incoming image frame to the main memory of the special-purpose hardware device to facilitate tracking the change in the position of the head-mounted-display system.

13. The special-purpose hardware device of claim 1, further comprising a frame-generation unit that:
    retrieves the change in the position of the head-mounted-display system; and
    while generating the augmented-reality frame, adjusts at least one aspect of the augmented-reality frame to account for the change in the position of the head-mounted-display system.

14. The special-purpose hardware device of claim 1, wherein the positional tracking component processes the portion of the image frames in the hardware-accelerator of the special-purpose hardware device as the image frames are received from the camera interface and before the image frames are stored in a main memory of the special-purpose hardware device.

15. The special-purpose hardware device of claim 1, wherein the positional tracking component further:
    stores at least a portion of the image frames directly in the main memory of the special-purpose hardware device before the image frames are processed by the hardware-accelerator of the special-purpose hardware device; and
    tracks the change in the position of the head-mounted-display system based at least in part on the portion of the image frames stored directly in the main memory of the special-purpose hardware device.

16. The special-purpose hardware device of claim 1, further comprising an image signal processor that:
    receives at least a portion of the image frames from the camera interface;
    performs at least one image processing operation on the received image frames; and
    forwards the processed image frames to the positional tracking component.

17. A head-mounted-display system comprising:
at least one camera device that captures image frames of a physical environment surrounding the head-mounted-display system;
a special-purpose hardware device communicatively coupled to the camera device, wherein the special-purpose hardware device:
processes at least a portion of the image frames in a hardware-accelerator that:
detects one or more features of the physical environment within an incoming image frame as the incoming image frame is received; and
passes the features to a main memory of the special-purpose hardware device to be incorporated into an image map that identifies physical locations of the features of the physical environment;
tracks, based at least in part on the image map, a change in a position of the head-mounted-display system within the physical environment; and
stores the change in the position of the head-mounted-display system for use in generating at least one augmented-reality frame to be presented to a user wearing the head-mounted-display system; and
a display device communicatively coupled to the special-purpose hardware device, wherein the display device:
receives the augmented-reality frame from the special-purpose hardware device; and
presents the augmented-reality frame to the user wearing the head-mounted-display system.

18. The head-mounted-display system of claim 17, further comprising at least one communication interface communicatively coupled to an independent host device that feeds virtual image content from the independent host device to the head-mounted-display system.

19. A method comprising:
receiving, by a special-purpose hardware device from a camera device of a head-mounted-display system, image frames of a physical environment surrounding the head-mounted-display system;
processing, by the special-purpose hardware device, at least a portion of the image frames in a hardware-accelerator that:
detects one or more features of the physical environment within an incoming image frame as the incoming image frame is received; and
passes the features to a main memory of the special-purpose hardware device to be incorporated into an image map that identifies physical locations of the features of the physical environment;
tracking, by the special-purpose hardware device based at least in part on the image map, a change in a position of the head-mounted-display system within the physical environment;
storing, by the special-purpose hardware device, the change in the position of the head-mounted-display system for use in generating at least one augmented-reality frame to be presented to a user wearing the head-mounted-display system; and
feeding, by the special-purpose hardware device, the augmented-reality frame to a display device of the head-mounted-display system such that the display device presents the augmented-reality frame to a user wearing the head-mounted-display system.

\* \* \* \* \*